United States Patent [19]

Masak et al.

[11] Patent Number: 6,094,401

[45] Date of Patent: Jul. 25, 2000

[54] INVERSE VERTICAL SEISMIC PROFILING USING A MEASUREMENT WHILE DRILLING TOOL AS A SEISMIC SOURCE

[75] Inventors: Peter C. Masak, Missouri City; David L. Malone, Sugar Land, both of Tex.

[73] Assignee: Schlumberger Technology Corporation, Sugar Land, Tex.

[21] Appl. No.: 09/131,137

[22] Filed: Aug. 7, 1998

Related U.S. Application Data

[62] Division of application No. 08/614,288, Mar. 12, 1996, Pat. No. 5,901,113.

[51] Int. Cl.[7] .............................. G01V 1/40; H04H 9/00
[52] U.S. Cl. .............................. 367/84; 367/81; 367/83; 367/85; 181/106
[58] Field of Search .................................. 367/81, 83, 84, 367/85; 175/40, 50; 181/106

[56] References Cited

U.S. PATENT DOCUMENTS

| | | |
|---|---|---|
| 2,062,151 | 11/1936 | Weatherby . |
| 2,688,124 | 11/1954 | Doty et al. . |
| 3,881,168 | 4/1975 | Farr et al. . |
| 3,909,776 | 9/1975 | Broding et al. . |
| 3,997,867 | 12/1976 | Claycomb ................................ 367/84 |
| 4,033,429 | 7/1977 | Farr . |
| 4,144,949 | 3/1979 | Silverman . |
| 4,207,619 | 6/1980 | Klaveness . |
| 4,252,209 | 2/1981 | Silverman . |
| 4,363,112 | 12/1982 | Widrow . |
| 4,365,322 | 12/1982 | Widrow . |
| 4,597,464 | 7/1986 | Chelminski . |
| 4,718,048 | 1/1988 | Staron et al. . |
| 4,847,815 | 7/1989 | Malone . |
| 4,849,945 | 7/1989 | Widrow . |
| 4,926,391 | 5/1990 | Rector et al. . |
| 4,926,392 | 5/1990 | Handley et al. . |
| 4,928,783 | 5/1990 | Crook . |
| 4,964,087 | 10/1990 | Widrow . |
| 4,969,129 | 11/1990 | Currie . |

(List continued on next page.)

FOREIGN PATENT DOCUMENTS

| | | |
|---|---|---|
| 2 251 686 | 7/1992 | United Kingdom . |
| WO 93/07514 | 4/1993 | WIPO . |

OTHER PUBLICATIONS

Solstad, Arne, et al. "MPT Pulser as Seismic Isonic Source", EAEG 55th Meeting and Technical Exhibition, Stavanger, Norway, (Jun. 7–11, 1993), Paper C049.

Hardage, B., Vertical Seismic Profiling, Geophysical Press, 1985, Chapter 1, pp. 1–5.

*Primary Examiner*—Nelson Moskowitz
*Attorney, Agent, or Firm*—David P. Gordon; Wayne I. Kanak; Victor H. Segura

[57] ABSTRACT

A reverse VSP system is provided and uses a frequency-controllable modulator of an MWD tool as a downhole seismic source. The modulator has a rotor and stator arranged to provide substantially sinusoidal outputs, and is controlled to provide a "Vibroseis"-type frequency sweep (preferably from 1 Hz to 50 Hz). With the bit of the MWD tool in contact with the bottom of the borehole, the force generated by the frequency-controllable modulator will generate measurable axial compressional (P-) waves. These waves which move through the formation are detected by an array of geophones on the formation surface, and a reference signal is obtained by a kelly-mounted accelerometer or strain gauge. The reference signal and signals obtained by the geophones are processed using known signal processing techniques. The disclosed downhole frequency-controllable seismic source provides many advantages including: good resolution due to the ability to output a sinusoidal wave at desired frequencies and the fact that the location of the source signal is well-defined (at the bit), the ability to image formations ahead of the bit, and the ability to conduct reverse VSP processing without adding downhole hardware equipment and without requiring trips out of the well.

2 Claims, 11 Drawing Sheets

U.S. PATENT DOCUMENTS

| | | |
|---|---|---|
| 5,012,453 | 4/1991 | Katz . |
| 5,050,130 | 9/1991 | Rector et al. . |
| 5,109,947 | 5/1992 | Rector . |
| 5,131,488 | 7/1992 | Green et al. . |
| 5,135,072 | 8/1992 | Meynier . |
| 5,144,591 | 9/1992 | Hardage . |
| 5,146,433 | 9/1992 | Kosmala et al. . |
| 5,159,160 | 10/1992 | Brett . |
| 5,160,814 | 11/1992 | Petermann . |
| 5,191,557 | 3/1993 | Rector et al. . |
| 5,237,540 | 8/1993 | Malone . |
| 5,249,161 | 9/1993 | Jones et al. ............... 367/83 |
| 5,309,405 | 5/1994 | Brett et al. . |
| 5,372,207 | 12/1994 | Naville et al. . |
| 5,375,098 | 12/1994 | Malone et al. . |
| 5,382,760 | 1/1995 | Staron et al. . |
| 5,418,335 | 5/1995 | Winbow . |
| 5,421,420 | 6/1995 | Malone et al. . |
| 5,438,170 | 8/1995 | Klaveness . |
| 5,467,320 | 11/1995 | Maki, Jr. . |
| 5,511,038 | 4/1996 | Angeleri et al. . |
| 5,517,464 | 5/1996 | Lerner et al. . |
| 5,537,364 | 7/1996 | Howlett . |
| 5,586,083 | 12/1996 | Chin et al. . |
| 5,740,126 | 4/1998 | Chin et al. ............... 367/84 |

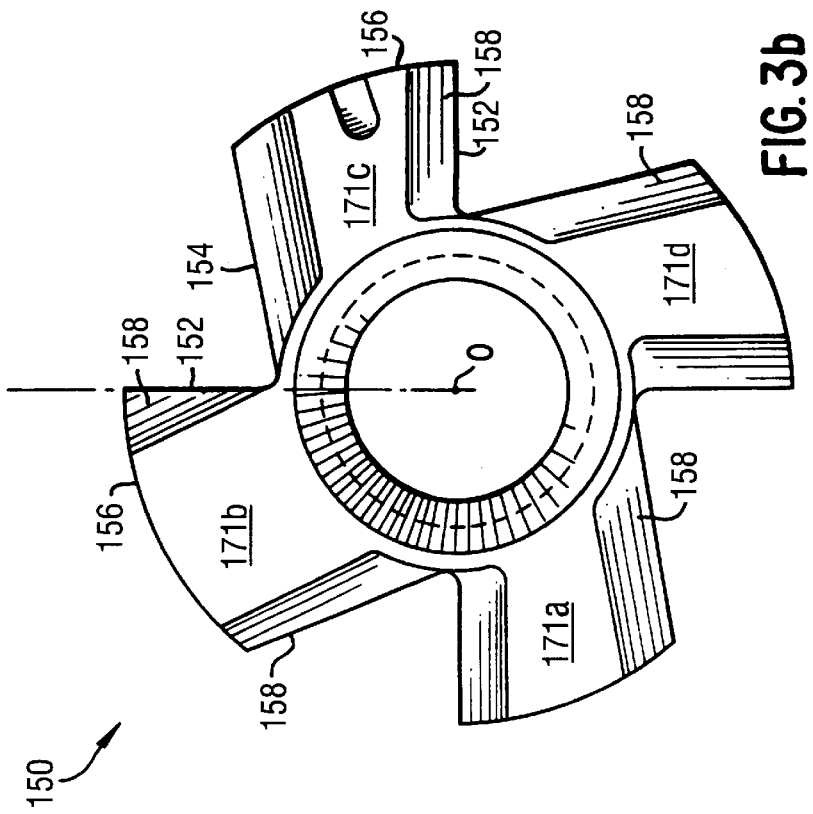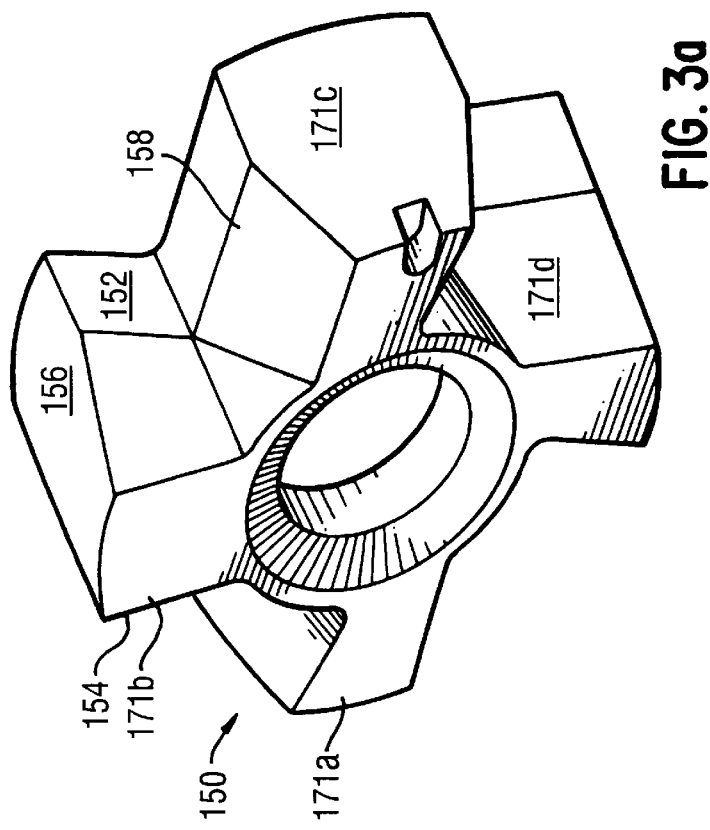

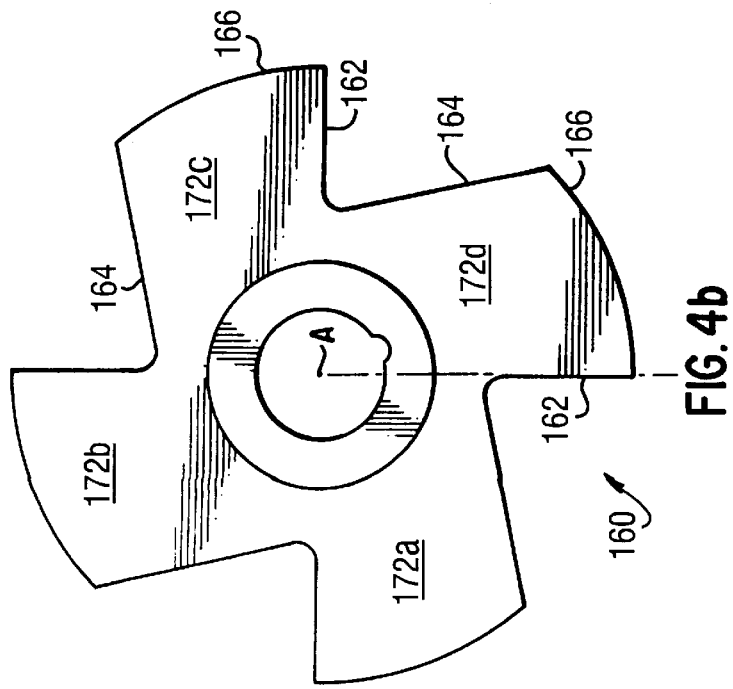
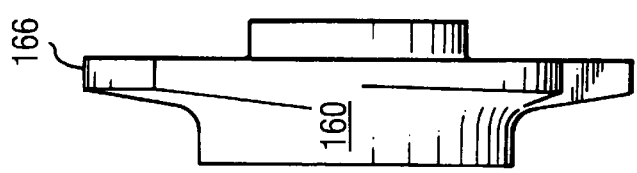
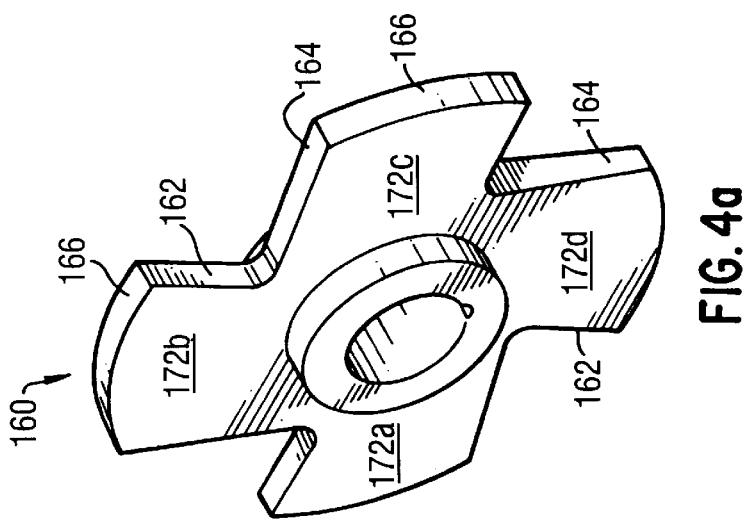

INVERSE VERTICAL SEISMIC PROFILING USING A MEASUREMENT WHILE DRILLING TOOL AS A SEISMIC SOURCE

This is a division of application Ser. No. 08/614,288, filed Mar. 12, 1996, now U.S. Pat. No. 5,901,113.

BACKGROUND OF THE INVENTION

1. Field of the Invention

The present invention relates to the profiling of geological formations. More particularly, the present invention relates to the use of a drilling tool as a frequency-controlled seismic source for the inverse or reverse vertical seismic profiling or imaging of a formation.

2. Description of the Related Art

Conventional reflection seismology utilizes surface sources and surface receivers to detect reflections from subsurface acoustic impedance contrasts; i.e., subsurface strata. The image and information obtained utilizing conventional reflection seismology is considered relatively poor due to long travel paths between the sources, reflectors, and receivers.

A technique known as vertical seismic profiling (VSP) has been used to provide more accurate information regarding the formation in the vicinity of a borehole. In VSP, seismic sources are located at the surface, and sensors (geophones) are suspended in the borehole with a wireline. When the sources are fired, the received data is recorded and processed for several borehole depths. VSP has the drawbacks, however, that each surface source is costly to apply, adds to acquisition time and rig inactivity, and generates multiple ghost images due to energy trapped in the surface layer. In addition, in drilling applications where the geophones would have to be added to an MWD (measurement while drilling) tool string, unless the downhole geophones could be decoupled from the drill string, they would only be capable of recording the relatively large first arrival event. Furthermore, downhole geophones are sensitive to tube wave events traveling up and down the borehole. Thus, to date, vertical seismic profiling has not been successful in MWD applications.

In order to overcome some of the problems relating to explosive sources used in conjunction with VSP, "Vibroseis" (a trademark of Conoco Incorporated) sources have been utilized. The "Vibroseis" source (described in U.S. Pat. No. 2,688,124) comprises vibrators which are carried on trucks which are coupled to the formation surface and which generate a frequency sweep from 10–90 Hz over a period of time. The trucks move to pre-designated source locations, lower their heavy baseplates, and start vibrating through the use of a hydraulic system. However, the "Vibroseis" source technique still suffers from several drawbacks. These include difficulty in correctly locating the trucks and in establishing good ground contact.

Long ago it was recognized that it might be possible to switch the location of the seismic source and the detectors; i.e., provide an "inverse" or "reverse" VSP (hereinafter referred to as "reverse VSP" or "RVSP"). A downhole source overcomes the logistical limitations inherent in using multiple surface sources, and permits simultaneous data acquisition at the surface with little cost.

Various different downhole source schemes have been proposed over the years. Some of the downhole source schemes utilize the drill bit as the source, while others use sources other than the drill bit. Of the former, U.S. Pat. No. 2,062,151 to Weatherby suggests using the drill bit as an impulse generator of seismic waves, while U.S. Pat. No. 4,363,112 and U.S. Pat. No. 4,365,322 to Widrow suggest using the continuous natural random vibrations of the drill bit to launch seismic waves. Techniques such as disclosed in U.S. Pat. No. 5,050,130 to Rector et al., can be useful in processing the information obtained from such a drill bit seismic source. Of the schemes which suggest using a source other than a drill bit, U.S. Pat. No. 3,909,776 to Broding et al. suggests using a fluid driven oscillator which changes emitted frequency as a function of time (much like a "Vibroseis" source), U.S. Pat. No. 3,881,168 to Farr et al. suggests using a monofrequency fluid oscillator, while U.S. Pat. No. 4,207,619 to Klaveness suggests using a pulse generator located in the drill string just above the drill bit. In addition, U.S. Pat. No. 4,033,429 to Farr suggests providing a seismic source in a drill string by modifying a section of a drill pipe to reduce it in diameter and provide a port, and providing a cylindrical sleeve surrounding the modified drill pipe section. The sleeve is provided with mud ports arranged in a helical path, with the spacing of the ports varying from a fifteen degree spacing at one end of the helix to a one hundred twenty degree spacing at the other end of the helix. To create a seismic signal, the entire drill string is lifted off of the hole bottom, and the drill pipe (and drill bit) is rotated and moves downward. The movement of the drill pipe port past the sleeve ports generates a series of pressure pulses in a siren-like fashion which change in frequency due to the spacing of the sleeve ports. The rotation rate of the drill pipe will therefore control the specific frequency range of the sweep.

While the idea of utilizing a "Vibroseis" type seismic source downhole is conceptually advantageous, the techniques proposed in the art for generating such a source have not been feasible. In particular, the fluid driven oscillator of Broding et al. will not provide a discrete point of signal excitation and will thereby "smear" the seismic image, and the oscillator must be inconveniently added to the drill string at extra expense. Additionally, in deviated wells, wellbore friction makes smooth rotation of the drill string impossible, causing variations in signal frequency. Finally, the drill string must be removed from the borehole each time the system is operated, forcing costly delays in the drilling process. With respect to U.S. Pat. No. 4,033,429 to Farr, the requirement to modify and rotate the drill pipe in order to effect a seismic source is disadvantageous for several reasons. First, in Farr, the drilling process and the seismic signal generation process are exclusive of each other, such that tripping out is required to move from drilling to seismic signal generation and vice versa. Second, the rotation of the drill pipe during seismic signal generation will cause banging on the side of the well which will generate undesirable noise. Third, because the seismic signal is being generated by a pressure differential across different orifices, the location where the pressure is being generated (i.e., the source signal location) will be undesirably uncertain.

SUMMARY OF THE INVENTION

It is therefore an object of the invention to provide a downhole seismic source capable of generating a sweep of frequencies.

It is another object of the invention to provide a downhole seismic source having a definitive signal location.

It is a further object of the invention to provide a downhole seismic source which generates a signal without excessive noise.

It is an additional object of the invention to provide a downhole seismic source capable of generating a sweep of frequencies by using an MWD tool without downhole modification or tripping out.

Another object of the invention is to provide a reverse VSP system utilizing an MWD tool as a downhole source which is capable of generating a sweep of frequencies.

A further object of the invention is to provide a method of generating a downhole seismic source capable of generating a sweep of frequencies without significant interruption of the drilling process.

In accord with the objects of the invention, the downhole seismic source comprises a frequency-controllable modulator of an MWD tool which is used to provide a large force to the drill bit which is in contact with the formation. The frequency-controllable modulator preferably provides a substantially sinusoidal output, and is controlled to provide a "Vibroseis"-type frequency sweep. Since the bit is in contact with the bottom of the borehole, the force generated by the frequency-controllable modulator will generate measurable axial compressional (P-) waves. Because the bit may also be in contact with side walls of the borehole by virtue of friction or via a stabilizer, the force generated by the modulator may also provide measurable transverse shear (S-) waves. Regardless of whether P-waves and/or S-waves are generated, the force, which depends on the peak-to-peak pressure variations developed at the modulator and the cross-sectional area of the modulator, will be large (e.g., as high as 3000 lbs.)

According to one preferred aspect of the invention, the MWD tool used to generate the frequency controllable seismic signal is substantially the tool described in U.S. Pat. No. 5,375,098 to Malone et al. which is hereby incorporated by reference in its entirety herein, and is known as the "PowerPulse" tool of Schlumberger. Accordingly, the MWD tool includes a modulator with a rotor and stator which are arranged (as disclosed in U.S. Pat. No. 4,847,815 to Malone which is hereby incorporated by reference in its entirety herein) to provide a sinusoidal signal, a brushless DC motor having a rotating drive shaft which is coupled to the rotor, a position sensor coupled to the rotating drive shaft to provide rotational position indications, motor drive circuitry for driving the motor, and a microprocessor coupled to the position sensor and motor drive circuitry which causes the motor drive circuitry to provide drive signals to the brushless DC motor based on rotational positions of the brushless DC motor and based upon desired positions as described by the microprocessor. As used in conjunction with the invention, the "PowerPulse" tool is programmed to cause the rotor to generate a sinusoidal frequency sweep. The frequency sweep may be accomplished by slowly and continuously varying the frequency over time, or by providing a signal at a first frequency for a desirable amount of time (e.g., ten seconds), changing the frequency to a second frequency for a desirable amount of time, and continuing to change the frequency until a variable frequency sweep is accomplished over a desired range of frequencies.

In accord with another preferred aspect of the invention, the frequency sweep is chosen to extend from 1 Hz to 50 Hz. According to yet another preferred aspect of the invention, signal processing is accomplished by using a kelly-mounted accelerometer or strain gauge which provides a reference signal against which a cross-correlation may be done. This procedure allows identification and stacking of waveforms based on the assumption of origination from a common source and reflector. A signal processing technique offering a substantial signal-to-noise ratio is described in U.S. Pat. No. 4,926,392 by Handley.

The downhole frequency-controllable seismic source of the invention provides many advantages over the seismic sources of the prior art. Because the source is downhole, the resolution of the reverse VSP processing will be relatively good, and formations ahead of the bit may be imaged before being reached by the MWD tool. In addition, because the modulator utilized in the invention outputs a substantially sinusoidal signal, the modulator source can provide large amounts of energy (equivalent to a dynamite source) by remaining at desired frequencies over periods of time (i.e., by sweeping slowly), thereby improving the signal to noise ratio. Furthermore, because the seismic signal is applied through the bit, the location of the source is well known. Further yet, the invention permits reverse VSP processing without adding downhole hardware equipment, and without requiring trips out of the well or significantly delaying the drilling process.

Additional objects and advantages of the invention will become apparent to those skilled in the art upon reference to the detailed description taken in conjunction with the provided figures.

BRIEF DESCRIPTION OF THE DRAWINGS

FIGS. 3a and 3b are respectively isometric and front plan views of the preferred stator of FIG. 2d.

FIGS. 4a, 4b, and 4c are respectively isometric, front plan, and side elevational views of the preferred rotor of FIG. 2d.

FIG. 6b is a software flow diagram of the motor control software for the microprocessor of FIGS. 2 and 6a.

DESCRIPTION OF THE PREFERRED EMBODIMENTS

Figure 1:
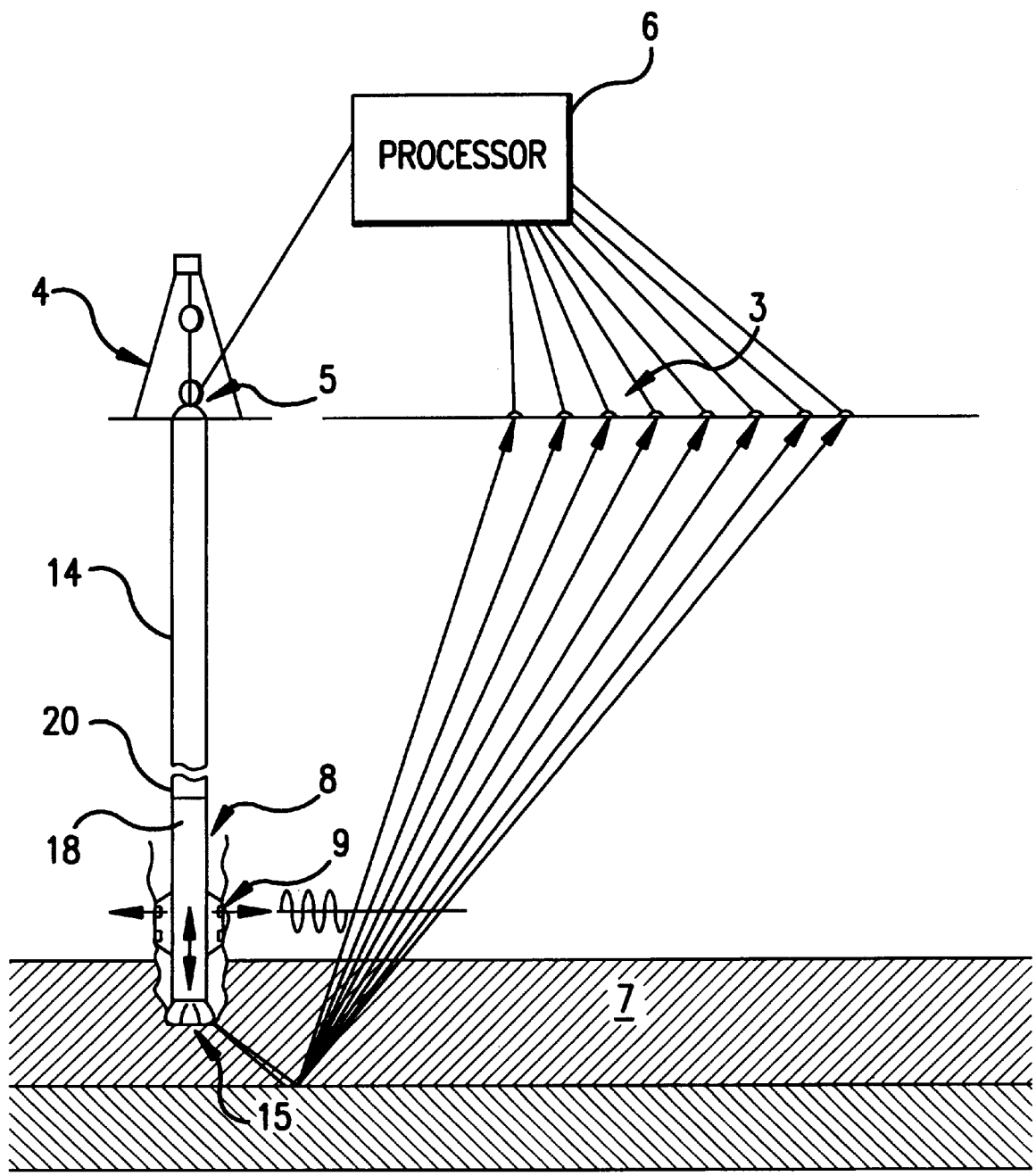
FIG. 1 is a schematic diagram of the reverse VSP system of the invention.
Figure 1A:
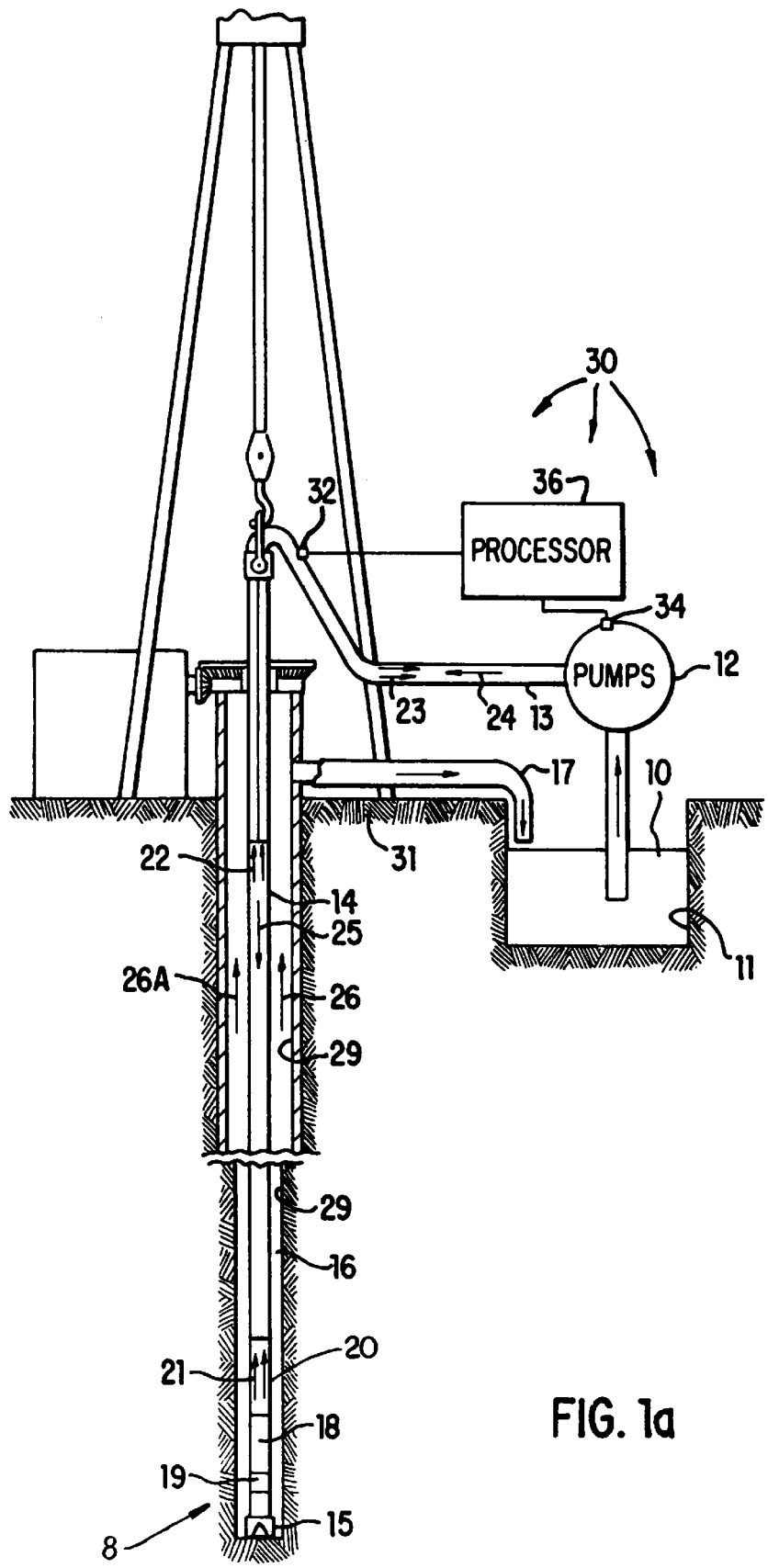
FIG. 1a is a diagram of the MWD tool of the invention in its typical drilling environment.

The system of the invention as seen in FIG. 1 includes an array or string of surface sensors (geophones) 3, a drilling rig 4 with accelerometers or strain gauges 5 coupled thereto, a processor 6 which receives and processes information from the accelerometers or strain gauges and the geophones 3, and a drill string 14 which is supported by the rig 4 and which includes an MWD tool 8, a drill bit 15, and drill bit stabilizer blades 9. As will be described in more detail hereinafter, the MWD tool 8 includes a downhole pressure pulse signaling device 18, and a measurement instrument package 19 (FIG. 1a). As will also be described in more detail hereinafter, the signaling device 18 comprises a frequency controllable sinusoidal modulator. According to the preferred embodiment of the invention, when it is desired to conduct a reverse VSP process, the sinusoidal modulator is controlled by a programmed microprocessor 91 (FIG. 2) to output a frequency sweep from approximately 1–50 Hz. The frequency sweep is conducted with the drill bit 15 preferably contacting the bottom of the borehole, so that the mud pulsing through the modulator applies pressure to the drill bit and hence to the formation 7. However, while the frequency sweep is conducted, the drilling is preferably stopped; i.e., no other pressure is applied to the bit other than the weight of the drill string and the pressure applied by the mud pulsing through the modulator.

It should be appreciated that the mud pulse energy is and can be applied to the formation through different mechanisms. In the preferred embodiment, with the drill bit contacting the bottom of the borehole, the axial shaking force generated by the mud pulses of the modulator will generate compressional (P-) waves. The axial shaking force depends on the peak-to-peak pressure variations developed at the modulator, and the cross-sectional area of the modulator, as the force equals the pressure times the area. With the "PowerPulse" tool of Schlumberger, a 3000 lb. axial shaking force would be typical. The actual load transferred to the formation depends on the characteristic impedance of the steel drill collar versus the characteristic impedance of the formation and also the inertia and stiffness characteristics of the bottom hole assembly. The inertia effect may be reduced by using an axial decoupling device or shock sub 20 (FIG. 1a) above the MWD tool, thereby enhancing coupling of the axial force to the formation. At the same time, it will be appreciated that the shaking force can also be coupled to the borehole wall via the stabilizers 9 and contact friction forces. Such a coupling will typically generate shear (S-) waves. Thus, while it is preferred that the bit be in contact with the bottom of the borehole in conducting the reverse VSP according to the invention, it will be appreciated that the invention could also be used to generate S-waves with or without the bit being in contact with the bottom of the borehole.

As the frequency sweep is conducted, the kelly-mounted accelerometers or strain gauges 5 record a reference signal while the geophones 3 record signals which are transmitted through the formation 7. VSP processing is then conducted by the processor 6 by cross-correlating the reference signal received by the accelerometers or strain gauges 5 to the signals recorded at the geophones 3. Cross-correlation uses a technique which defines the offset in time between the source (reference vibration) and the signal, and allows identification and stacking of waveforms based on the assumption of origination from a common source and reflector (common depth point stacking). A signal processing technique offering a substantial signal-to-noise ratio is described in U.S. Pat. No. 4,926,392 to Handley. It will be appreciated that the velocity of sound in the formation in the region between the downhole source and surface can be accurately defined, as the first arrival at the geophones will be P-waves from the direct transit between the MWD tool source and the geophone string (check shot survey). Later P-wave and S-wave arrivals will occur and can be interpreted as reflections from seismic reflectors. It will also be appreciated that different signal processing techniques can be utilized in conjunction with the preferred embodiment of the invention.

Referring to FIG. 1a, the operation of the MWD tool 8 in a typical drilling arrangement is illustrated schematically. Drilling mud 10 is picked up from mud pit 11 by one or more mud pumps 12 which are typically of the piston reciprocating type. The mud 10 is circulated through mud line 13, down through the drill string 14, through the drill bit 15, and back to the surface of the formation via the annulus 16 between the drill string and the wall of the well bore 29. Upon reaching the earth's surface 31, the mud is discharged through line 17 back into the mud pit 11 where cuttings of rock or other well debris are allowed to settle out before the mud is recirculated.

The MWD tool 8 includes a downhole pressure pulse signaling device 18 for transmission of data signals derived during the drilling operation by the measurement instrument package 19. A preferred rotor and stator for the signaling device which generates sinusoidal signals is discussed hereinafter with reference to FIGS. 3a, 3b, and 4a–4c, although a similar device disclosed in U.S. Pat. No. 4,847,815 may also be utilized. Data signals are encoded in a desired form (also as discussed hereinafter) by appropriate electronic means in the downhole tool. Arrows 21, 22, and 23 illustrate the path taken by the pressure pulses provided by the downhole signaling device 18 under typical well conditions. Pump 12 also produces pressure pulses in the mud line 13 and these are indicated by arrows, 24, 25, 26 and 26A which also illustrate the flow of the mud through the annulus 16.

In order for the downhole pressure pulse signals to be recovered at the surface, some means is preferably provided to remove or substantially eliminate the portion of the mud pressure signal due to the mud pumps. Subsystem 30, including pressure transducer 32, mud pump piston position sensors 34, and computer or processor 36, comprises one possible such means and is disclosed in detail in U.S. Pat. No. 5,146,433 which is hereby incorporated by reference herein.

Figures 2, 2A:
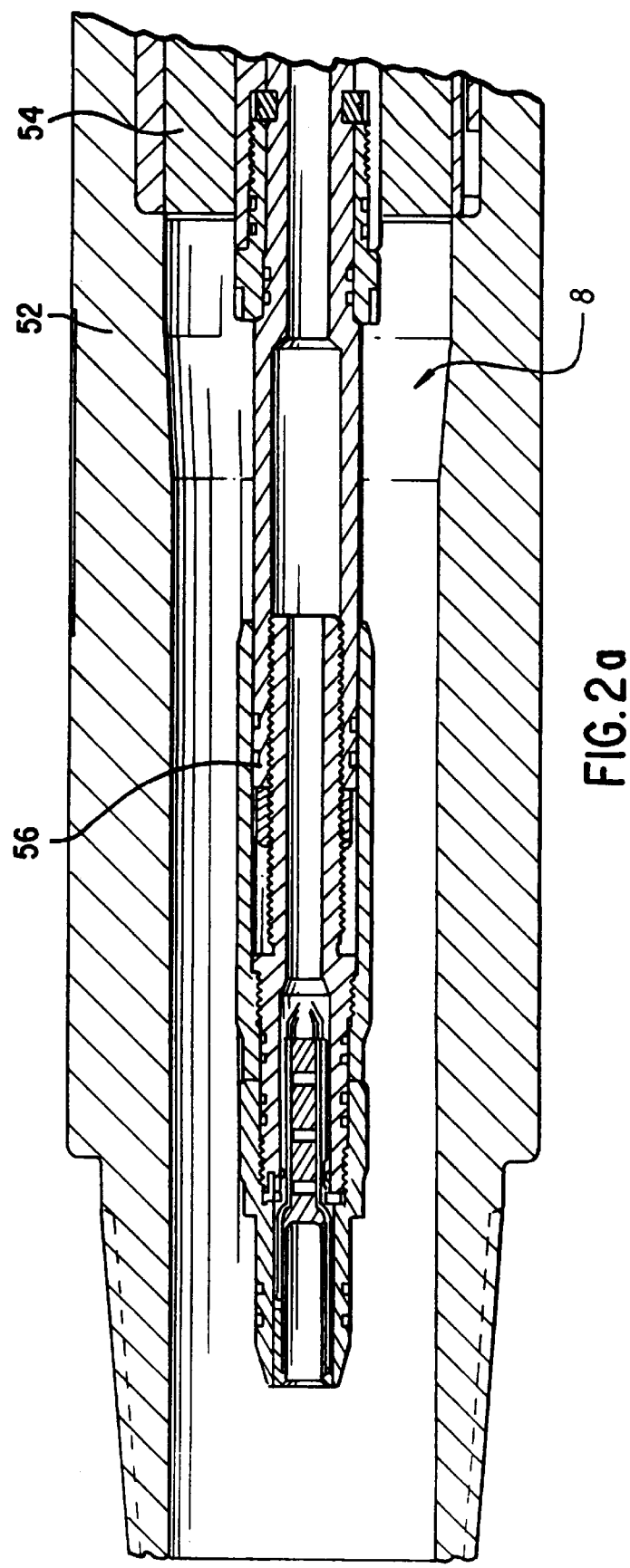
FIG. 2 is a schematic diagram of the MWD tool of the invention which shows how FIGS. 2a–2d relate to each other and also shows other components of the MWD tool.
FIGS. 2a and 2b, and 2c and 2d are respectively partially cut-away perspective representations, and cross sectional representations through portions of the preferred MWD tool of the invention.

Some of the more pertinent details of the MWD tool 8 are seen with reference to FIGS. 2 and 2a–2d. In FIGS. 2a–2d, the tool 8 is seen inside and supported by a drill collar 52. Thus, as seen in FIG. 2a, the tool 8 is provided with a shoulder 54 which supports the tool in the drill collar 52. Also seen in FIG. 2a are a local tool bus extender 56 which provides power and a data link to other sensors.

Figure 2B:
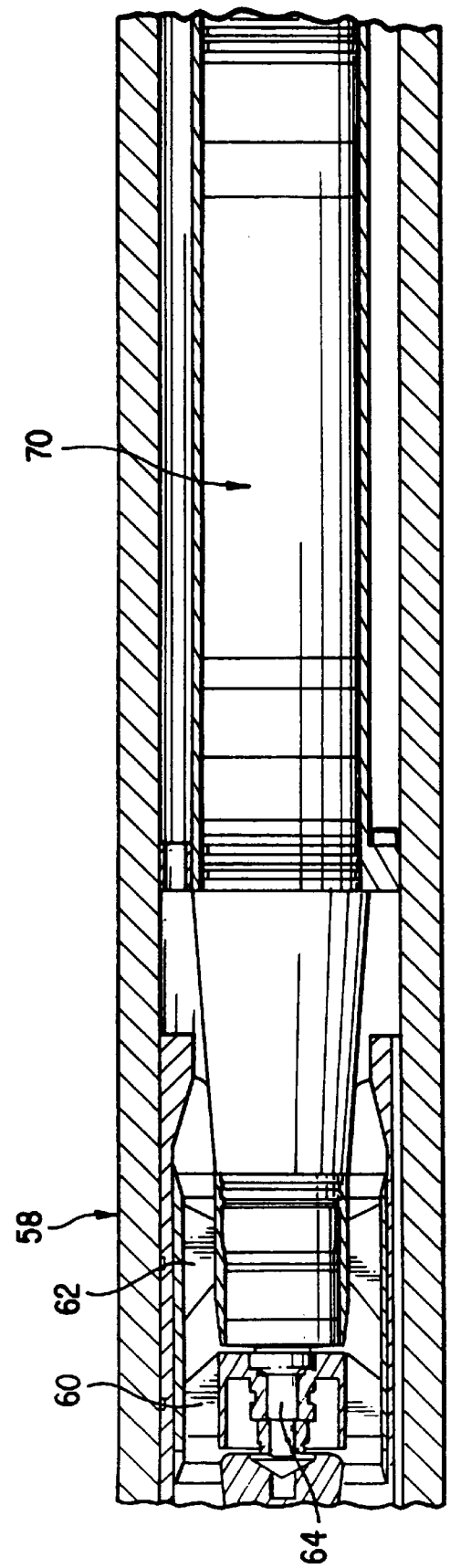

As seen in FIG. 2b, a turbine 58 is provided. The turbine includes a turbine rotor 60, a turbine stator 62, and a turbine shaft 64. The turbine 58 is driven by the mud circulating through the borehole and the MWD tool. As the mud pushes by the turbine 58, the turbine shaft 64 rotates. The turbine shaft 64 is coupled to an alternator 70 which uses the rotating shaft to generate an electric signal which is rectified for driving (powering) the brushless DC servo motor 100 (see FIG. 2c) and allowing the motor 100 to operate.

Turning to FIG. 2, as seen in schematic form, and located between the alternator 70 (of FIG. 2b) and the motor 100 (of FIG. 2c), are a pressure bulkhead 84, sensors 19 (inclinometers, etc.), an electronics package 90 including a microprocessor 91 (details of which will be discussed hereinafter with reference to FIGS. 6a, and 6b), and a pressure compensator 92. The pressure bulkhead 84 and compensator 92 keep the electronics package 90 and sensors 19 at or near atmospheric pressure so that they may function properly.

Figure 2C:
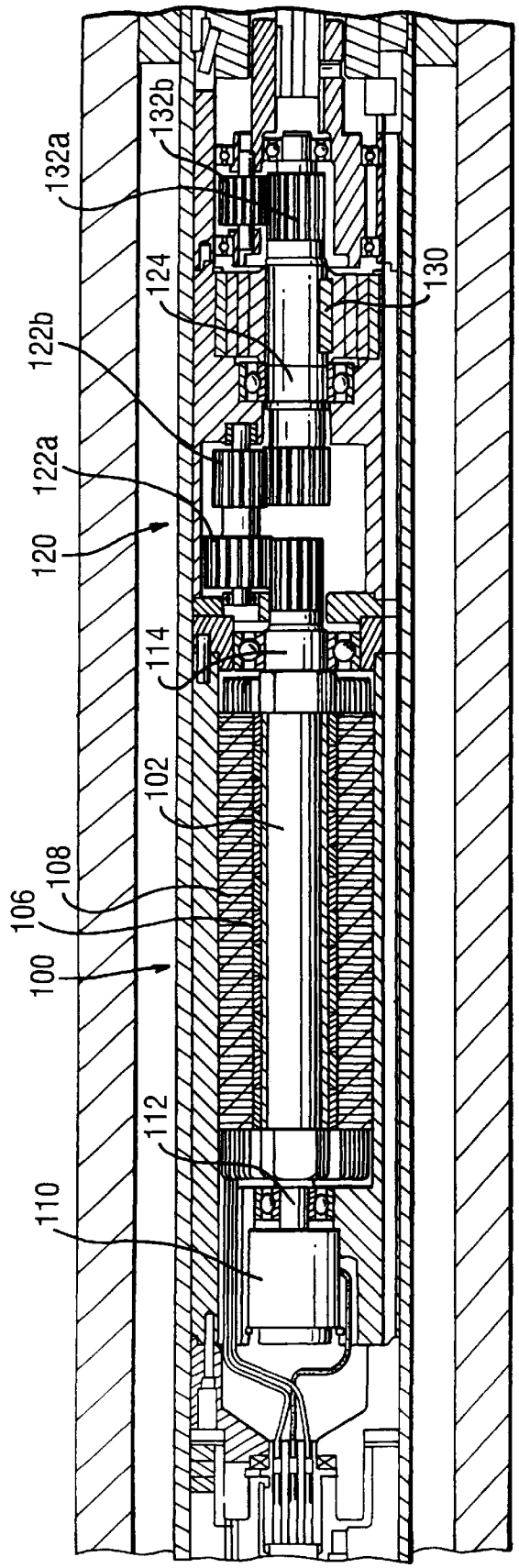
Figure 2D:
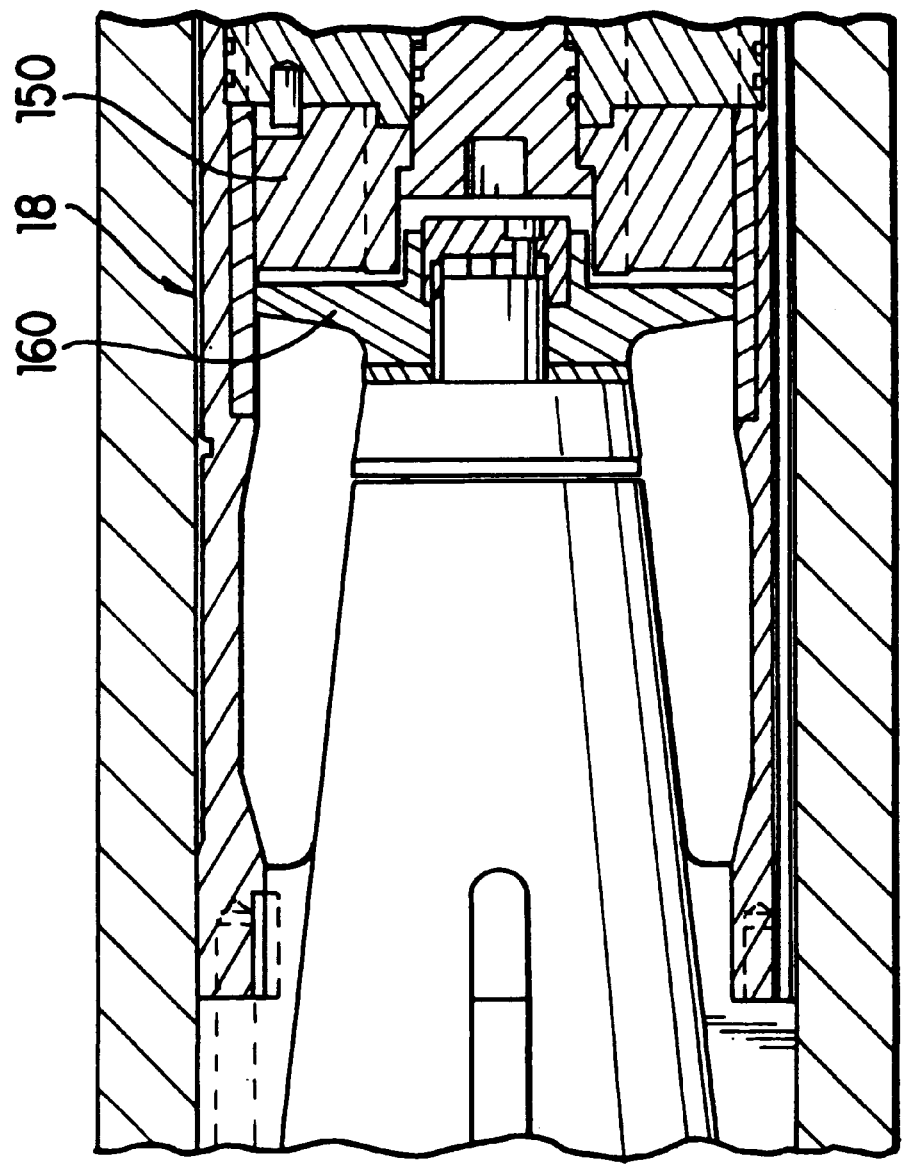

The brushless DC servo motor 100 which drives the rotor 160 (see FIG. 2d) of the MWD tool 8 is seen in FIG. 2c. In the preferred embodiment, the motor is a motor available from MOOG of East Aurora, N.Y. under part #303F052, and includes a motor shaft/motor 102, magnets 106, and a motor stator 108. On the tail end 112 of shaft 102 of the motor is located a position sensor 110 sold under part #JSSBH-15-C-1/P137 by the Clifton Precision subsidiary of Litton Systems, Inc., Clifton Heights, Pa. The function of the position sensor 110 is to determine exactly how far the shaft 102 has rotated. Preferably, the position sensor 110 resolves a single rotation of the shaft into four thousand ninety-six counts (twelve bits).

The driving end 114 of shaft 102 is coupled to a gear train 120 which reduces the rotation by a factor of eight; although it should be appreciated that other gear reductions or no gear reduction could be utilized depending upon the capabilities of the motor, and upon the frequencies which need to be generated. In the gear train 120, however, the first gears 122a and 122b of the gear train effect a 2:1 reduction in rotation speed. Located on the shaft 124 coupled to gear 122b is a magnetic positioner 130, discussed in detail hereinafter with reference to FIG. 5. The function of the magnetic positioner 130 is to prevent the modulator 18 (seen in FIG. 2d) from getting stuck in a closed position, and thereby preventing mud from circulating down through the MWD tool and driving the turbine 58.

As seen in FIG. 2c, the gear train 120 also includes gears 132a and 132b which effect a further 4:1 reduction in rotation speed of the shaft. Thus, the rotor 160 seen in FIG. 2d, rotates one time for every eight revolutions of the motor 100. Because the rotor 160 (as discussed in more detail with reference to FIGS. 3a, 3b, and 4a–4c) has four lobes, one full rotation of the rotor 160 relative to the stator 150 of FIG. 2d generates a signal approximating four sinusoids. With the eight to one reduction, two revolutions of the motor 100 are required to generate a single sinusoid from the signaling device 18 which includes the rotor 160 and stator 150 together. Again, as suggested above, depending upon the capabilities of the motor, different gear reduction ratios may be implemented in order to generate the desired frequency sweep.

FIGS. 3a and 3b are respectively isometric and front plan views of the preferred stator 150 of the invention. The stator 150 and the rotor 160 (shown in FIGS. 4a, 4b, and 4c) generally comply with the teachings of U.S. Pat. No. 4,847,815 and generate sinusoidal waves. In particular, the stator 150 is seen with four lobes 171a, 171b, 171c, and 171d. Each lobe has a first side 152 a second side 154 and an outer edge 156. As seen in FIG. 3b, the first side 152 is radial from the origin O of the stator. However, instead of the second side 154 of the lobe being parallel with the first side 152 (as taught in the preferred embodiment of U.S. Pat. No. 4,847,815), as shown in FIG. 3b, they are at an angle of approximately thirteen degrees relative to each other. Also, as shown in FIG. 3b, but seen better in FIG. 3a, the lobes 171 of the stator are undercut at an angle as seen at 158.

Turning to FIGS. 4a, 4b, and 4c, isometric, front plan, and side elevational views of the preferred rotor 160 are seen. The rotor 160, as discussed above with reference to FIGS. 2a–2d is coupled to a drive shaft which rotates the rotor 160 relative to the stator 150, thereby generating a signal. As with the stator 150, the rotor 160 has four lobes 172a, 172b, 172c, and 172d. Each lobe has a first side 162, a second side 164, and an outer edge 166. As seen in FIG. 4b, the first side 162 is radial from the origin A of the rotor. The second side 166 of the lobe is at an angle of approximately thirteen degrees relative to the first side 164. With the provided geometry of the stator 150 in conjunction with the similar geometry of the rotor 160, when the rotor is at a steady speed, the orifice between the rotor and the stator varies in time substantially with the inverse of the square root of a linear function of a sine wave (as discussed in detail in U.S. Pat. No. 4,847,815). The resulting signal is therefore generally sinusoidal in nature.

Figure 5:
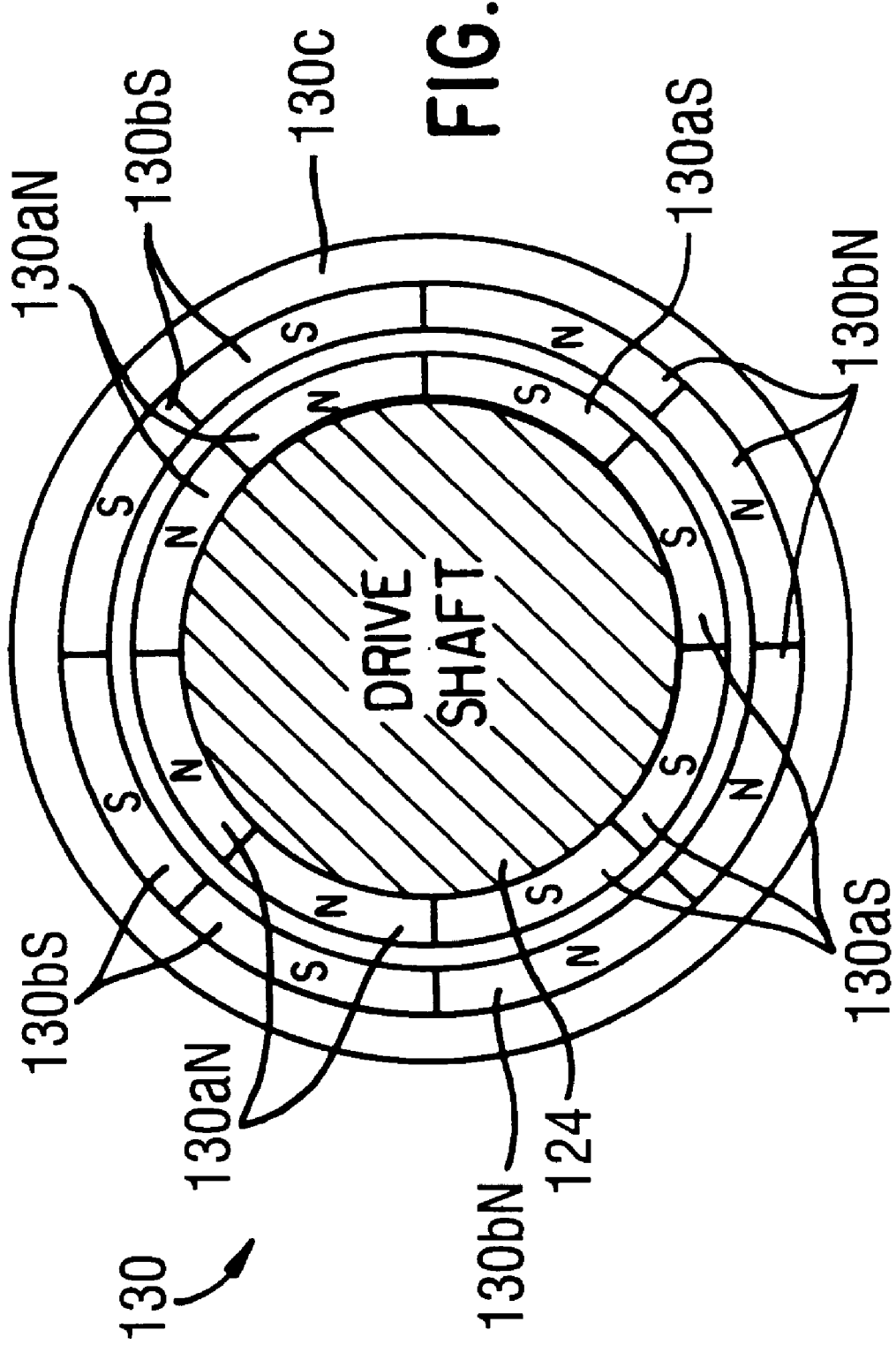
FIG. 5 is a cross sectional view of the magnetic positioner of FIG. 2c.

FIG. 5 is a cross sectional view of the magnetic positioner 130 of FIG. 2c. The magnetic positioner is comprised of four sets of magnets 130aS, 130aN, 130bS and 130bN. Two of the four sets of magnets 130aS and 130aN are coupled to the drive shaft 124 and rotate therewith. Inner magnets 130aS, as shown are "south" polarity magnets and extend one hundred eighty degrees around the drive shaft 124, while magnets 130aN, are "north" polarity magnets which extend the other one hundred eighty degrees around the drive shift 124. Axially displaced from and surrounding magnets 130aS and 130aN, and fixed to the housing 130c of the magnetic positioner are outer magnets 130bS and 130bN. Outer magnets 130bS (south polarity magnets) extend one hundred eighty degrees around magnets 130aS and 130aN, and outer magnets 130bN (north polarity) extending the other one hundred and eighty degrees around the inner magnets.

With the magnetic positioner 130 as provided, the rotor 150 is prevented from getting stuck in a closed position relative to the stator 150, and thereby preventing mud from circulating down through the MWD tool and driving the turbine 58. In particular, during jamming or during a power-down state, the magnets of magnetic positioner 130 will try to align themselves as shown in FIG. 5, with the south polarity inner magnets 130aS opposite the north polarity outer magnets 130bN, and the north polarity inner magnets 130aN opposite the south polarity outer magnets 130bS. The alignment of the magnets, causes the drive shaft 124 to rotate from whatever position it was in, to the position of FIG. 5. The rotation of the drive shaft in turn causes the rotor 160 to rotate. By placing the rotor 160 on its drive shaft in an "open" orientation relative to the stator 150 when the magnets are aligned as shown in FIG. 5, whenever the magnets return to the position of FIG. 5, the rotor 160 will be open relative to the stator 150. It will be appreciated that because of the 4:1 step down in gears (reduction), a one hundred eighty degree rotation of the drive shaft 124 of the magnetic positioner, will only effect a forty-five degree rotation of the drive shaft of the rotor 160. However, because the rotor 160 has four lobes, a forty-five degree rotation causes a rotor in a fully closed state to rotate into a fully open state.

As aforementioned, the turning of the rotor 160 of the signaling device 18 generates a sinusoidal signal. In order to generate the frequency sweep signal (as well as signals which can be used to transmit downhole data to the surface equipment for detection, processing, and decoding), the rotation of the rotor 160 is controlled by the motor 100 which in turn is controlled by the microprocessor 91. In the preferred embodiment, the microprocessor 91 is programmed in order to permit the modulator to generate any frequency up to 50 Hz. The measurement-while-drilling techniques for transmitting data through the mud, which are not directly pertinent to this invention, are disclosed in detail in previously incorporated U.S. Pat. No. 5,375,098.

In order to change the phase and/or frequency of the signal, the rotation of the rotor 160 is controlled by the motor 100. In turn, the rate at which the motor turns is controlled by a drive controller 191 (seen in FIG. 6a) under instructions of the microprocessor 91. An overview of this system is seen in FIG. 6a. As seen in block diagram form in FIG. 6a, and previously discussed with reference to FIG. 2c, coupled to the motor 100 (and typically on the motor shaft 102) is the position sensor or resolver 110. The shaft 102 is optionally stepped down by a 2:1 geartrain 120 to which the magnetic position 130 is coupled. Another geartrain 132a/132b is optionally provided to effect an additional 4:1 step down in rotation, and the four-lobed signaling device or modulator 18 is coupled thereto. As seen in FIG. 6a, the output of the position sensor 110 is provided to the microprocessor 91. The microprocessor, in turn, provides a duty cycle signal to the motor controller 191 which effectively pulse width modulates a DC power bus 192 to the motor 100, thereby controlling the speed of the motor. Thus, a feedback arrangement is set up, whereby if the motor moves the rotor too much (as sensed by the position sensor 110), the duty cycle is reduced by the microprocessor 91 and the drive signal of the controller 191 is reduced; while if the motor does not move the rotor enough, the duty cycle is increased, and the drive signal of the controller 191 to the motor 100 is increased.

Controlling the modulator over varying mud flow rates and mud densities requires the motor software to perform several tasks in order to ensure the generation of a readable signal. In particular, the voltage produced by the alternator is roughly proportional to the flow rate, while the load on the modulator increases with increasing flow rate and mud weight. In order to control the modulator, an adaptive PD control algorithm is used for the motor (with a proportional—P term, and a derivative—D term), with gains being constantly adjusted to compensate for the varying bus voltages and loads encountered. It will be appreciated that while an adaptive PD control algorithm is preferred, other control algorithms known in the art can also be used.

Figure 6A:
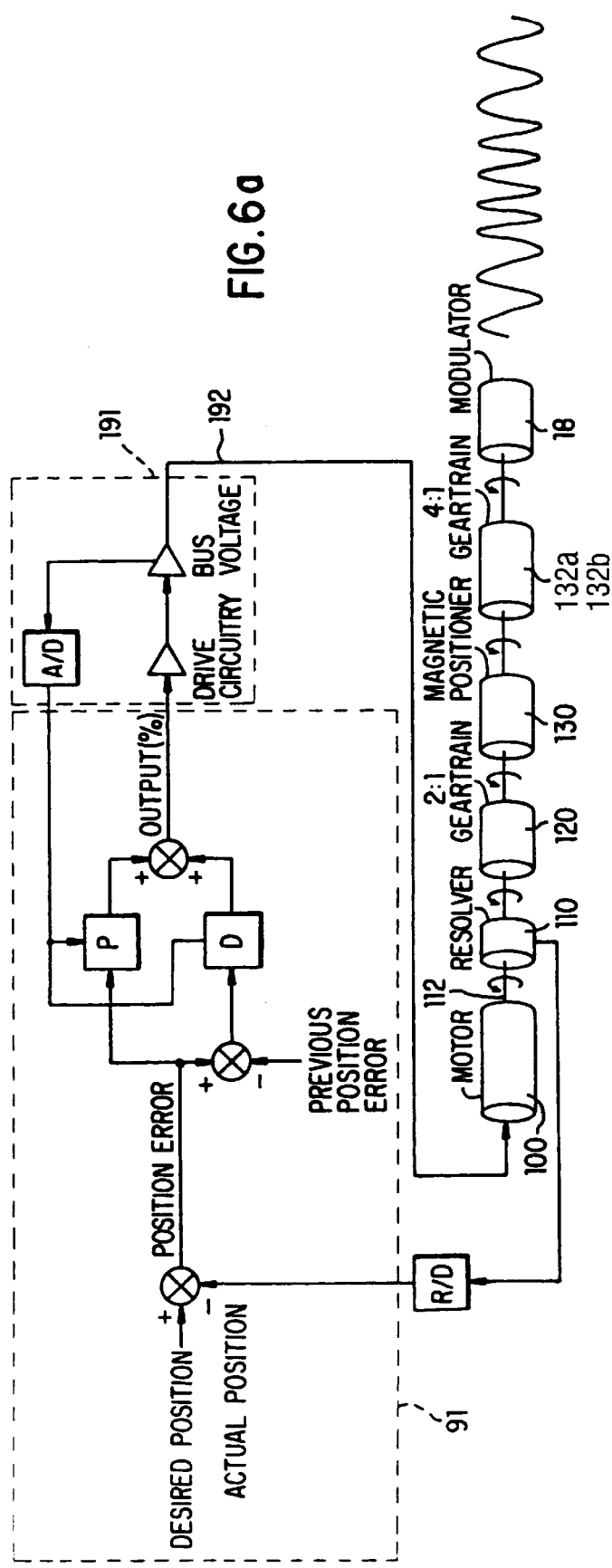
FIG. 6a is a block diagram of the motor drive apparatus and motor controller function of the invention.
Figure 6B:
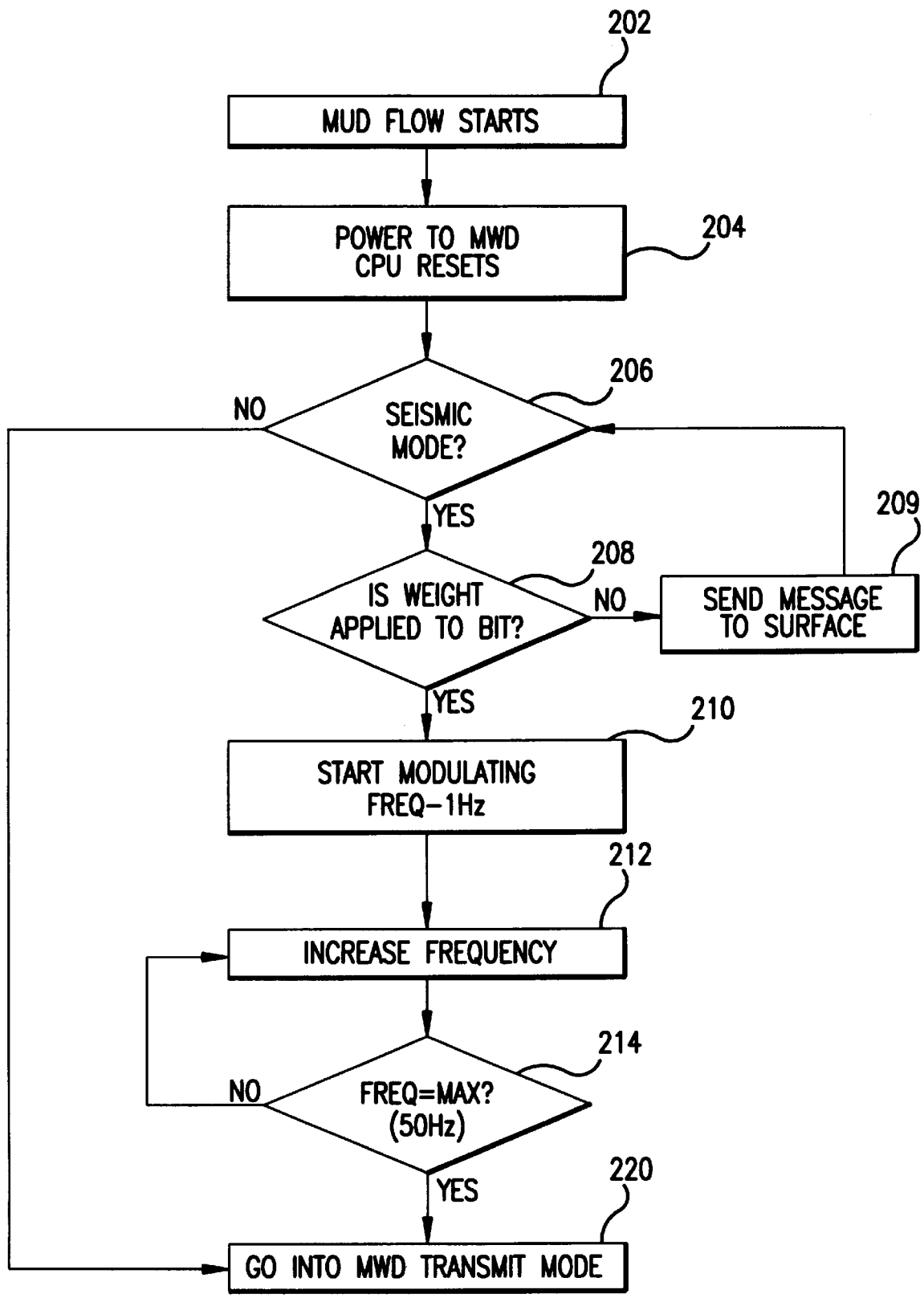

In FIG. 6b, a high level software flow diagram is seen of the motor control software for the microprocessor 91 of FIGS. 2 and 6a which causes the frequency sweep to be accomplished. It will be appreciated that additional software is utilized by the microprocessor 91 to effect transmission of data via the mud as is described in detail in previously incorporated U.S. Pat. No. 5,375,098. Thus, as seen in FIG. 6b, after the mud flow has started at 202 and the power to the MWD tool has been supplied, the CPU resets at 204. At 206, a decision is made as to whether the MWD tool is to be used to convey information (MWD transmit mode) or to generate a seismic signal (seismic mode). If the MWD tool is to be used to convey information via the mud, the program continues at step 220. However, if the MWD tool is to be used to provide a seismic signal, a determination is made at 208 as to whether weight is being applied to the bit. If not, at 209, a message is sent to the surface (via mud pulse telemetry) to apply weight to the bit, and the program continues at step 206. If weight is being applied to the bit, at 210, the modulator 18 is controlled to provide a fixed frequency (e.g., 1 Hz). At step 212, the frequency is increased by a desired amount. At step 214, if the frequency has reached a desired maximum (e.g., 50 Hz), the program continues at 220 by moving into the MWD transmit mode. If the maximum desired frequency has not been reached, the program continues at step 212 by increasing the frequency by a desired amount. It will be appreciated by those skilled in the art that the amount that the frequency of the modulator is increased at step 212 depends on the frequency at which steps 212 and 214 are carried out. In other words, if the frequency is checked every millisecond, it may be desirable to increase the frequency of the modulator by an amount on the order of a millihertz. However, if the frequency is checked only every half a second, it may be desirable to increase the frequency of the modulator by an amount on the order of 0.1 Hz.

It should be appreciated that instead of running a frequency sweep of from 1 Hz to 50 Hz, different frequency sweeps could be utilized. For example, using the Schlumberger "PowerPulse" tool with changes only to the software, the frequency sweep might more typically range from 0 to 30 Hz. However, the "Vibroseis"-type processing would remain substantially the same, with account being made for the different frequency range.

With the software, apparatus, and system of the invention as described, it will be appreciated that the method of the invention generally comprises locating the drill string with the MWD tool as described downhole, and with the drill bit preferably engaging the bottom of the borehole, generating a frequency sweep by causing the rotor of the MWD tool modulator to ramp its speed over a period time. The generally sinusoidal output of the modulator is preferably caused to sweep over a range from 1 to 50 Hz. At the surface, the P-wave and/or S-wave signals generated downhole are detected by an array of geophones, while the kelly-mounted accelerometer or strain gauge obtains a reference signal. The reference signal and the signals obtained by the geophones are then utilized in manners known in the art to provide seismic profiling information (e.g., imaging) regarding the formation.

There have been described and illustrated herein apparatus, systems and methods for seismic profiling which utilize the modulator of an MWD tool as a downhole seismic source. While particular embodiments of the invention have been described, it is not intended that the invention be limited thereto, as it is intended that the invention be as broad in scope as the art will allow and that the specification be read likewise. Thus, while the invention has been described with reference to a preferred MWD tool (the "PowerPulse" tool of Schlumberger), it will be appreciated that other MWD tools which utilize a modulator to generate substantially sine wave outputs could be used. Likewise, while a preferred high level software flow diagram was provided for the downhole microprocessor in order to cause the modulator to generate a frequency sweep, it will be appreciated that other software, firmware or hardware could be utilized. Also, it will be appreciated that while preferred VSP processing techniques were disclosed which utilize the reference signal and the signals obtained by geophones at the formation surface, other processing techniques could be utilized. Likewise, while the invention was described with reference to an uphole signal causing the microprocessor downhole to start the software routine for causing the modulator to generate a frequency sweep, it can be appreciated that the frequency sweep could be generated automatically downhole based on desired parameters; e.g., after drilling a certain distance, or each time drilling must be stopped, or each time a change in formation density is observed, etc. It will therefore be appreciated by those skilled in the art that yet other modifications could be made to the provided invention without deviating from its spirit and scope as so claimed.

We claim:

1. A method for generating a seismic signal in a formation traversed by a borehole having borehole fluid therein to obtain information regarding said formation, and utilizing a borehole tool having formation contact means for coupling the borehole tool to the formation, a motor with a rotating drive shaft, a rotor coupled to the drive shaft, a stator which is stationary relative to the rotor, with the rotor and stator arranged to provide substantially sinusoidal signals in the borehold fluid as the rotor turns relative to the stator, a microprocessor means coupled to the motor for causing the motor to turn the rotor, said method comprising:

a) coupling said borehole tool to the formation utilizing the formation contact means;

b) controlling said motor with said microprocessor means so as to turn said rotor such that said substantially sinusoidal signals change in frequency in a frequency sweep over a predetermined frequency range;

c) imparting a force against said formation via said contact means to produce a seismic signal; and d) receiving seismic waveform information relating to said seismic signal with at least one geophone located on or near a surface of said formation.

2. A method according to claim 1, wherein said formation contact means is a drill bit or at least one stabilizer blade, step (a) comprising:

causing the drill bit to contact the bottom of the borehole or causing at least one stabilizer blade to contact a side of the borehole.

* * * * *